C. MATHEWS.
SUPPORT.
APPLICATION FILED DEC. 20, 1913.
1,139,204.
Patented May 11, 1915.
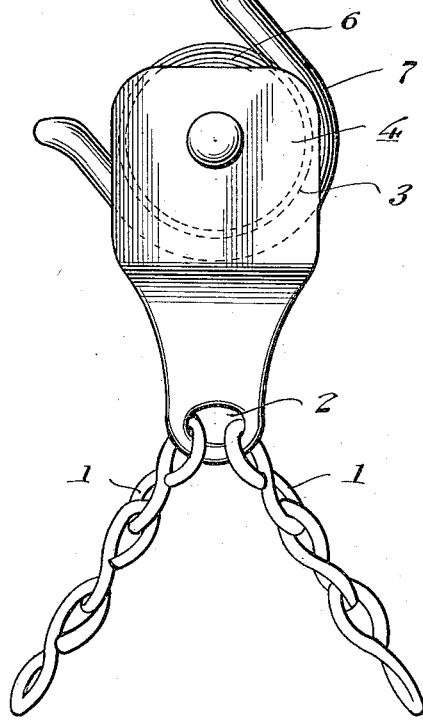
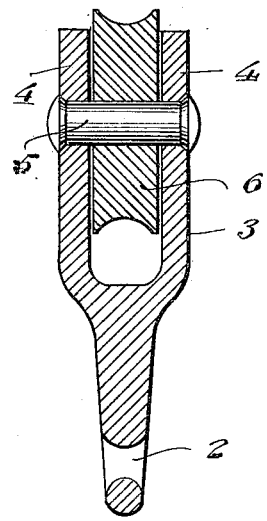
Witnesses
H. B. Byrd.
D. Edmonston
Inventor
Charles Mathews
By Victor J. Evans
Attorney
THE NORRIS PETERS CO., PHOTO-LITHO., WASHINGTON, D. C.

UNITED STATES PATENT OFFICE.

CHARLES MATHEWS, OF CAMBRIDGE, OHIO.

SUPPORT.

1,139,204.

Specification of Letters Patent.

Patented May 11, 1915.

Application filed December 20, 1913. Serial No. 808,002.

*To all whom it may concern:*

Be it known that I, CHARLES MATHEWS, a citizen of the United States, residing at Cambridge, in the county of Guernsey and State of Ohio, have invented new and useful Improvements in Supports, of which the following is a specification.

This invention relates to swinging supports and the object of the invention is to provide a simple and efficient device which will prevent wear upon the chains and to eliminate noise.

The invention consists essentially in connecting the end of the supporting chains and the pulley block which has the pulley thereof engaged over or surrounded by the screw hook which is entered into the ceiling or other support.

Further objects of the invention will appear as the following description is read in connection with the accompanying drawing, which forms a part of this application, and in which:—

Figure 1 is a side elevation. Fig. 2 is an enlarged vertical sectional view.

Referring more particularly to the drawing, 1 represents the supporting chains which are connected at their upper ends to an apertured ear 2 depending from the pulley block 3. The chains 1 are arranged to be connected at their lower ends to the swing, as is usual, and may be removably or permanently connected to the ear 2, as is found most desirable. Extending across the side plates 4 of the pulley block is a journal pin 5 upon which is journaled a grooved pulley 6. This pulley is rotatably mounted upon the journal pin 5 and is engaged by the hook 7 of the screw hook 8 so as to be removable therefrom when it is desired to take the swing down.

What is claimed is:—

In a swing support, in combination a hooked member, adapted to engage a suitable support, a pulley removably attached to the hooked member, and a pulley block, said block being formed of a single piece of metal, and comprising a pair of spaced sides in which the pulley is journaled, and an ear formed integral with the sides, said ear having an aperture therein, for the reception of the chains of the swing.

In testimony whereof I affix my signature in presence of two witnesses.

CHARLES MATHEWS.

Witnesses:
T. A. BONNELL,
W. W. STEWART.

Copies of this patent may be obtained for five cents each, by addressing the "Commissioner of Patents, Washington, D. C."